(12) United States Patent
Davidoff

(10) Patent No.: US 11,767,108 B2
(45) Date of Patent: Sep. 26, 2023

(54) AIRCRAFT (DRONE)

(71) Applicant: Vladimir Aleksandrovich Davidoff, Gomel (BY)

(72) Inventor: Vladimir Aleksandrovich Davidoff, Gomel (BY)

( * ) Notice: Subject to any disclaimer, the term of this patent is extended or adjusted under 35 U.S.C. 154(b) by 205 days.

(21) Appl. No.: 17/296,479

(22) PCT Filed: Nov. 25, 2019

(86) PCT No.: PCT/BY2019/000017
§ 371 (c)(1),
(2) Date: May 24, 2021

(87) PCT Pub. No.: WO2020/107091
PCT Pub. Date: Jun. 4, 2020

(65) Prior Publication Data
US 2022/0089280 A1  Mar. 24, 2022

(30) Foreign Application Priority Data

Nov. 30, 2018  (BY) .................................. 20180493

(51) Int. Cl.
| | |
|---|---|
| *B64C 31/02* | (2006.01) |
| *B64C 31/036* | (2006.01) |
| *B64C 39/02* | (2023.01) |
| *B64D 17/78* | (2006.01) |
| *B64U 10/25* | (2023.01) |
| *B64U 10/50* | (2023.01) |
| *B64U 30/20* | (2023.01) |

(52) U.S. Cl.
CPC .......... *B64C 31/036* (2013.01); *B64C 39/024* (2013.01); *B64D 17/78* (2013.01); *B64U 10/25* (2023.01); *B64U 10/50* (2023.01); *B64U 30/20* (2023.01)

(58) Field of Classification Search
CPC ..... B64C 31/036; B64C 39/024; B64D 17/78; B64U 10/25; B64U 10/50; B64U 30/20; B64U 50/13
See application file for complete search history.

(56) References Cited

U.S. PATENT DOCUMENTS

| | | | | |
|---|---|---|---|---|
| 1,718,577 | A * | 6/1929 | Pitcairn ................. | B64C 27/473 416/88 |
| 2,764,375 | A * | 9/1956 | Pierre .................... | B64D 17/52 244/152 |
| 3,612,449 | A * | 10/1971 | Sepp ...................... | B64D 17/52 244/145 |
| 3,937,424 | A * | 2/1976 | Meier ................... | H01M 50/00 429/99 |
| 7,246,769 | B2 * | 7/2007 | Yoeli ...................... | B60V 3/02 244/12.3 |

(Continued)

*Primary Examiner* — Justin M Benedik
(74) *Attorney, Agent, or Firm* — Bardmesser Law Group

(57) ABSTRACT

The present invention relates to the field of heavier-than-air aircraft, such as airplanes and unmanned aerial vehicles (UAV) and, in particular, to emergency rescue systems. The technical objective is accomplished by providing an aircraft, such as a drone, including a powerplant, a parachute, and a body. In particular, the parachute has a fixed shape, it is permanently in an opened state and is connected to the body by rigid braces, while the aircraft center of gravity is located below the aircraft aerodynamic center.

23 Claims, 19 Drawing Sheets

(56) References Cited

U.S. PATENT DOCUMENTS

| | | | | |
|---|---|---|---|---|
| 8,448,898 B1* | 5/2013 | Frolov | ................... | H02S 20/00 |
| | | | | 244/59 |
| 10,029,786 B1* | 7/2018 | Adams | ................... | B64D 17/30 |
| 10,279,902 B2* | 5/2019 | Childress | ............ | B64C 29/0091 |
| 11,318,847 B2* | 5/2022 | Zheng | ....................... | H02J 7/35 |
| 2005/0258306 A1* | 11/2005 | Barocela | ................ | B64C 39/10 |
| | | | | 244/30 |
| 2008/0083847 A1* | 4/2008 | Mau | ......................... | B64C 3/46 |
| | | | | 244/902 |
| 2012/0104151 A1* | 5/2012 | Mccann | ................... | B64D 1/08 |
| | | | | 244/137.4 |
| 2021/0039778 A1* | 2/2021 | Wallace-Morrison | ...................... | |
| | | | | B64D 17/80 |

\* cited by examiner

AIRCRAFT (DRONE)

CROSS REFERENCE TO RELATED APPLICATIONS

This application is US National Phase of PCT/BY/2019000017, filed on Nov. 25, 2019, which claims priority to Belarus Patent Application No. a 20180493, filed on Nov. 30, 2018.

BACKGROUND OF THE INVENTION

Field of the Invention

The present invention relates to the field of heavier-than-air aircraft, such as airplanes and unmanned aerial vehicles (UAVs, or drones) and, in particular, to emergency rescue systems for such aircraft.

Description of the Related Art

Inability to provide a sufficiently high level of flight safety using conventional systems in terms of ensuring the rescue of the civilian aircraft passengers and crew in emergency situations currently is limited to the use of parachute and soft landing systems.

A remotely piloted aircraft (RPAC) rescue system is known in the art, with the system including a powerplant, wings, a fuselage, and a RPAC control unit characterized in that a back-up powerplant is disposed opposite the first powerplant at the end of the fuselage and is fitted with a folding propeller blade, an electric motor with a variable speed unit and an electric motor battery [1].

A disadvantage of this system is a substantial dead weight of the back-up powerplant resulting in a higher cost of the powerplant itself, reduced system efficiency and excessive fuel consumption. There is a probability of failure of the back-up unit itself. The system operates up to exceeding the damage threshold exceedance. It is not possible to use the system in an automatic mode.

A flying wing design aircraft is known in the conventional art having a cabin for accommodating passengers and a crew in the flying wing fuselage compartment, with an emergency safety parachute system being disposed in a cavity of a rear aileron fairing, secured relative to the lateral axis of the center of gravity and automatically ejected in emergency situations [2].

This emergency and rescue system has a number of disadvantages that appear to be substantial. A parachute extraction system is characterized by a substantial lag and it will increase as the flight stages change: ascending, forward flight and descending, all of which affects its effectiveness. A major disadvantage of this system is that it is not possible to use it at low altitudes. There is a probability that under unfavorable weather conditions, such as high humidity and/or frost, the system will not be deployable. It is likely that the parachute will collapse when drawn into the aircraft air shadow. The safety parachute increases the aircraft dead weight. The system's false triggering may result in catastrophic consequences. Deploying the system by an operator precludes the possibility of using the system in an automatic mode.

A known emergency parachute equipment control device for unmanned aerial vehicles is capable of operating in the automatic mode, with the UAV comprising: a UAV body, a casing with a parachute, and an actuating assembly disposed in the main body and a connection body. The actuating assembly is configured to drive a transmission belt, thereby controlling the tilt of the parachute casing [3]. This device has the same disadvantages inherent to parachute systems.

The latter technical solution is taken as a prototype.

SUMMARY OF THE INVENTION

The present invention is related to aircraft, such as drones (UAVs), and particularly, to drone whose wing is shaped as a rigid parachute.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF EMBODIMENTS OF THE INVENTION

Figure 1:
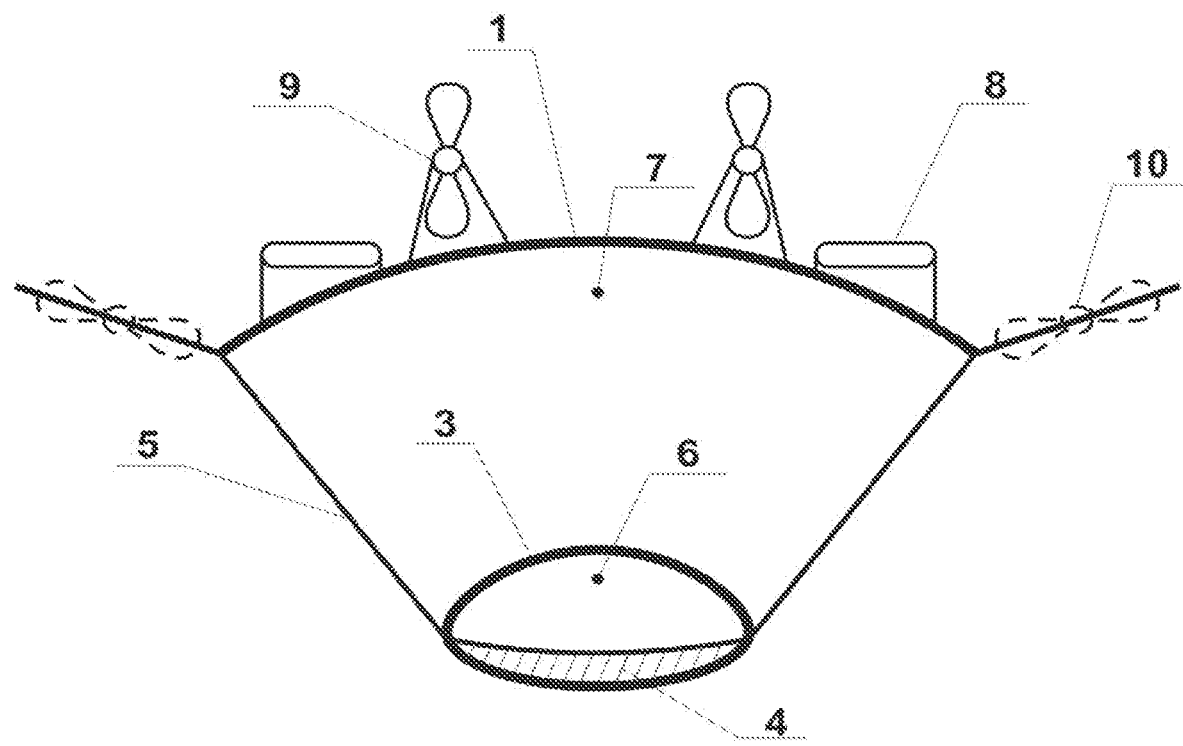
FIG. 1 illustrates a front view of the aircraft (the slots are not shown).

Reference will now be made in detail to the embodiments of the present invention, examples of which are illustrated in the accompanying drawings.

The technical object of the invention is to provide an aircraft passive safe landing system having the following features: entering a passive parachuting mode without using a control system; ensuring a vertical downward gliding and acceptable parachuting descent speed at a minimal parachute canopy area; going into the parachuting mode at any flight altitude, reducing weather effects and reducing aircraft dead weight.

The technical objective is to be accomplished by providing an aircraft comprising a powerplant, a parachute and a body. In particular, the parachute has a fixed shape, it is permanently in an opened state and is connected to the body by rigid braces, while the aircraft center of gravity is located below the aircraft aerodynamic center.

The novelty in the provided method is that the parachute has a fixed shape, it is permanently in an opened state and is connected to the body by rigid braces, while the aircraft center of gravity is located below the aircraft aerodynamic center.

The location of the aircraft center of gravity below the aerodynamic center of the aircraft provides for stable parachuting without using any control systems, since at any aircraft tilt angle, a force vector is produced that returns the aircraft to the vertical position. The aircraft is put into upright position automatically without operator intervention.

An ejection mechanism and an ejection mechanism control system are not required for the fixed-shape parachute and no time is required for triggering the parachute deployment. In this case, the risk of the parachute collapse when drawn into the aircraft air shadow or affected by side gusts is eliminated.

An alternative embodiment may provide the aircraft in which the angle between the vertical axis passing through the aerodynamic focus and the axis connecting the aircraft aerodynamic center and the center of gravity is less than 11 degrees (preferably less than 10 degrees, and preferably less than 9 degrees, with around 0 degrees being optimal). This limits the maximum tilt angle during the uncontrollable parachuting and as a result reduces the maximum horizontal parachuting speed.

An alternative embodiment may provide the aircraft in which the parachute has one or more slots and/or a pole vent. Slots allow the vertical descent speed to be reduced up to 20%. The air moving at a high speed along the parachute upper surface produces a pressure drop which in its turn results in significant pressure differential between the upper and lower parts of the parachute, thereby reducing the rate of descent. In this case, a centrally symmetrical airflow over the parachute allows for the vertical parachuting without acquiring a horizontal speed as a result of parachuting.

An alternative embodiment may provide the aircraft in which the parachute parts forming slots are arranged at different height. Such a form of slots directs an accelerated airflow along the parachute upper surface, thereby increasing the pressure drop between the upper and lower parts of the parachute.

An alternative embodiment may provide the aircraft in which slots in the parachute are arranged in a centrally symmetrical manner. The arrangement and shape of slots are selected so that during the vertical parachuting the air passing through slots flows over the parachute in a centrally symmetrical manner.

An alternative embodiment may provide the aircraft in which slots are arranged along and/or across and/or in a circle and/or over the ellipse of the parachute and the air passing therethrough is directed across the parachute and/or along the parachute from the center toward edges or vice versa from parachute edges toward the center.

An alternative embodiment may provide the aircraft in which slots direct the airflow from the parachute edges to the parachute center. Alternatively, the slots may be arranged across the parachute, thereby the air passing therethrough is directed along the parachute. Alternatively, the slots may be arranged in a circular pattern, thereby the air passing therethrough during the parachuting is directed from the parachute edges to the center or vice versa from the parachute center to the edges.

An alternative embodiment may provide the aircraft in which braces are made crushable and a lower part of the body has a designated deformation zone configured to absorb the energy of a probable impact in case of a crash landing.

An alternative embodiment may provide the aircraft in which the parachute has a wing airfoil, a chord and a span. The airfoil profile allows the parachute to be used as a wing while flying, thereby increasing the flight distance.

An alternative embodiment may provide the aircraft in which the aircraft center of gravity is located below the aerodynamic center of the aircraft by at least 0.5 of the parachute chord, preferably at least 0.75 of the parachute chord, more preferably at least 1.0 of the parachute chord, even more preferably at least 2.0 of the parachute chord. The location of the aircraft center of gravity lower by at least 0.5 (and preferably higher values, as listed above) of the parachute chord increases stability in the mid-course flight and when parachuting, thereby reducing aircraft over-swinging and the risk of overturning.

An alternative embodiment may provide the aircraft in which the parachute loading is up to 12 kg/m$^2$. Reducing the loading slows the aircraft parachuting descent speed, thereby reducing the risk for people and objects below.

An alternative embodiment may provide the aircraft in which a gap between the body and the parachute is not less than 0.9 of the body height, preferably not less than 1.0 of the body height, more preferably not less than 1.5 of the body height, even more preferably not less than 2.0 of the body height. This reduces positive interference of the air and improves the parachute blowing.

An alternative embodiment may provide the aircraft in which the control surfaces are disposed above the parachute (in the parachute air shadow when parachuting). This minimizes the influence of control surfaces during the aircraft emergency parachuting.

An alternative embodiment may provide the aircraft in which the wing has a V- or W-shaped section. This increases stability and allows both aircraft flight and emergency descent to be stabilized.

An alternative embodiment may provide the aircraft in which the parachute has an upward-convex shape.

An alternative embodiment may provide the aircraft in which the aircraft is equipped with at least one mid-flight engine with a thrust vector directed along the wing chord within a range of −12° to +12°. This angle allows for the airplane flight mode with a compensation of probable nose-down/nose-up pitching moments. Two mid-flight engines spaced from each other along the parachute transverse axis ensure the aircraft flight-forward longitudinal stability due to differential thrust control.

An alternative embodiment may provide the aircraft in which the powerplant is equipped with at least two engines having vertical take-off and landing propellers with a resultant thrust vector directed along the vertical axis passing through the aircraft aerodynamic center and center of gravity.

An alternative embodiment may provide the aircraft in which the braces are of a round or drop-like section.

The invention will become more apparent with reference to the accompanying drawings.

Figure 2:
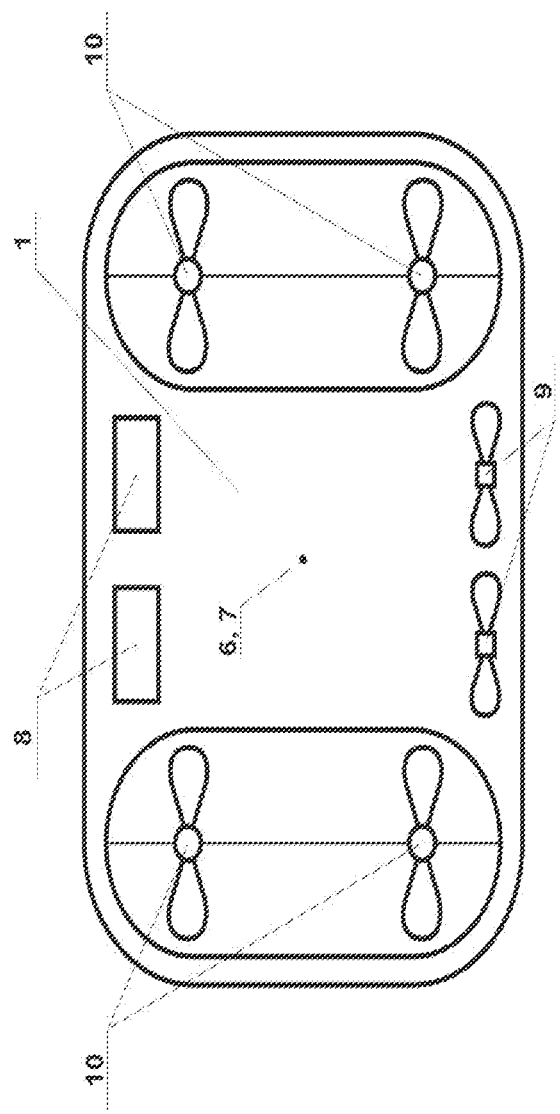
FIG. 2 illustrates a top (plan) view of the aircraft (the slots are not shown).
Figure 3:
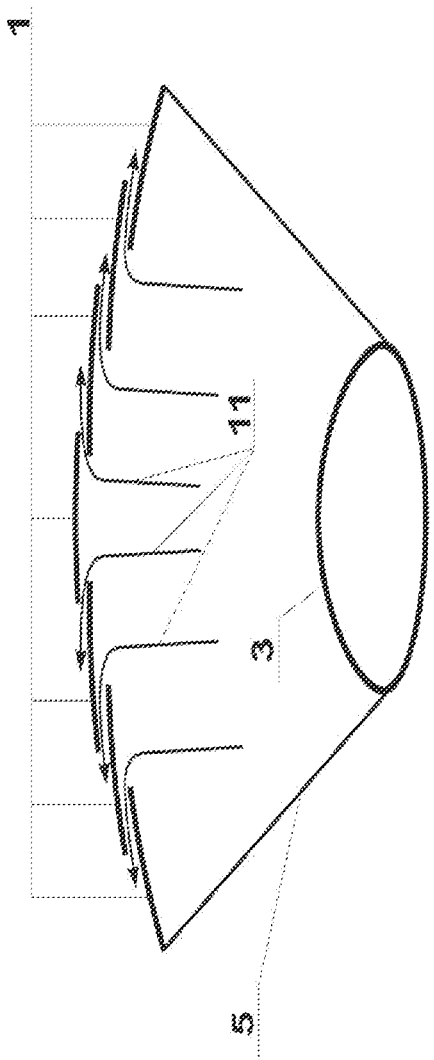
FIG. 3 illustrates a side view, with the air flow through the slots shown.
Figure 4A:
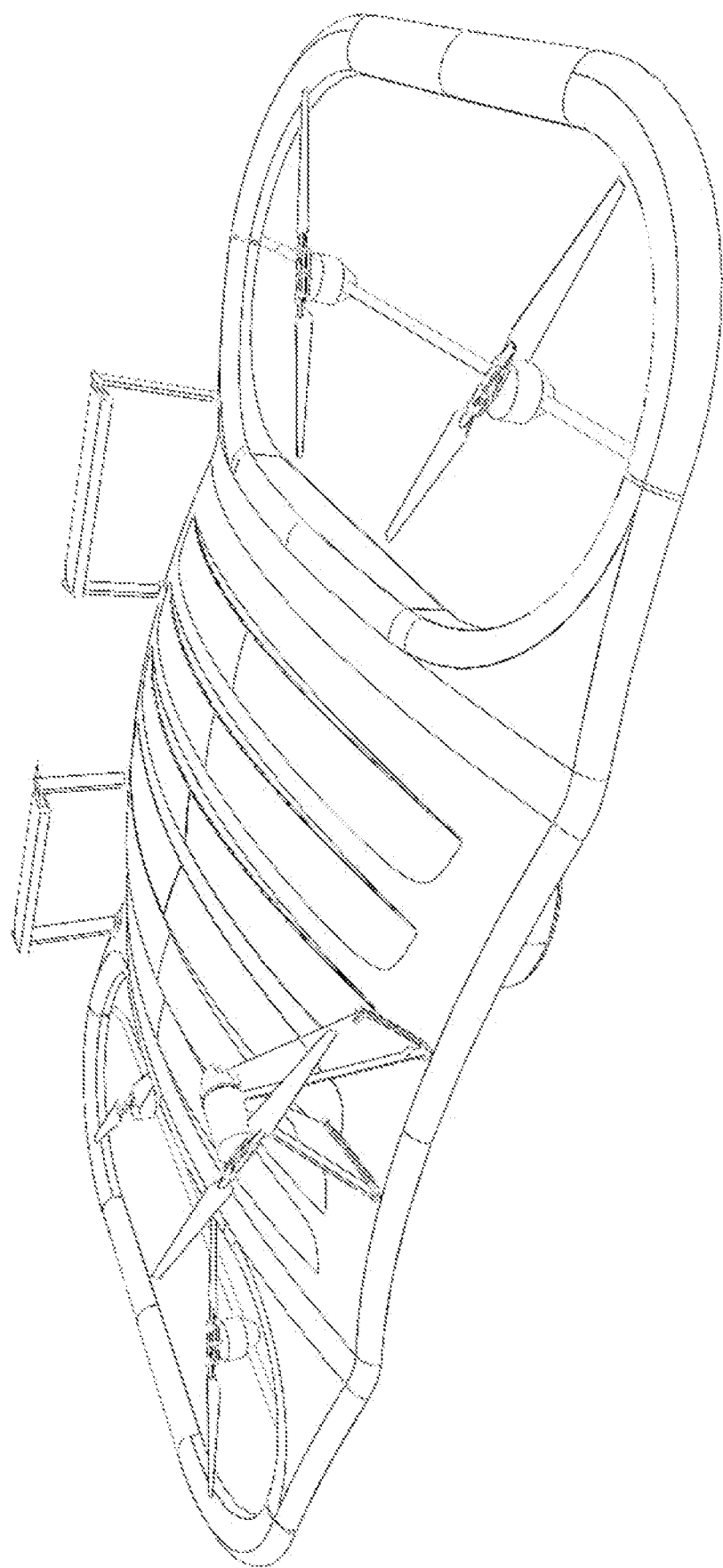
FIGS. 4A-4N illustrate various perspective views of the aircraft.
Figure 4B:
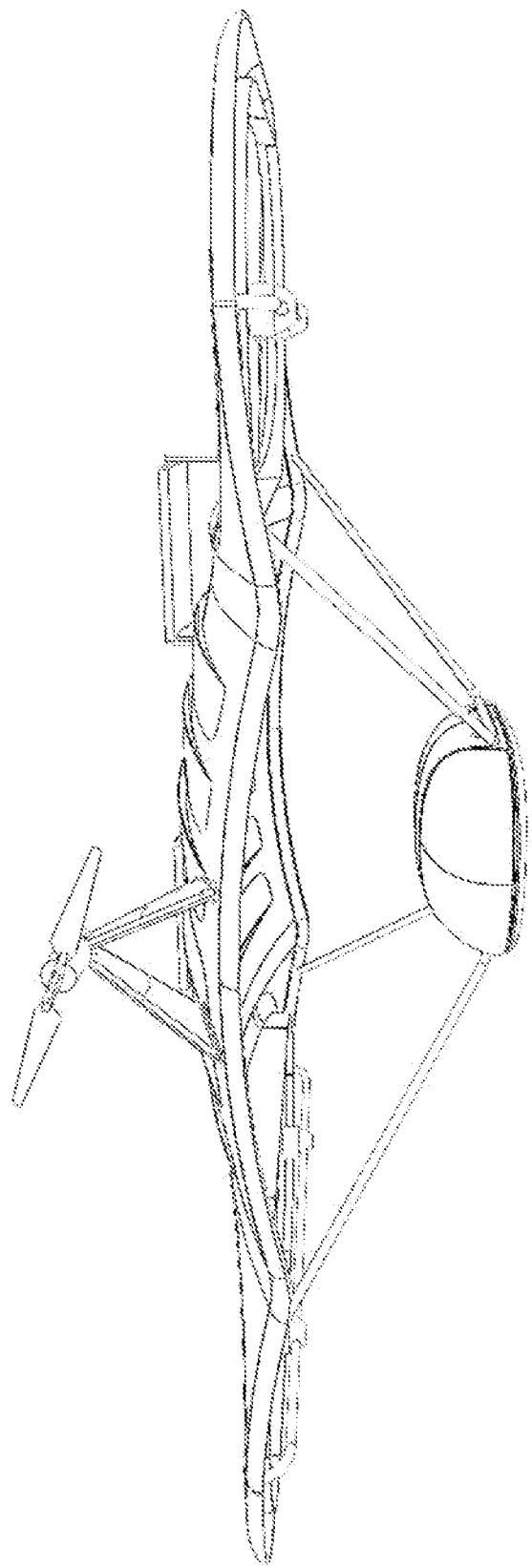
Figure 4C:
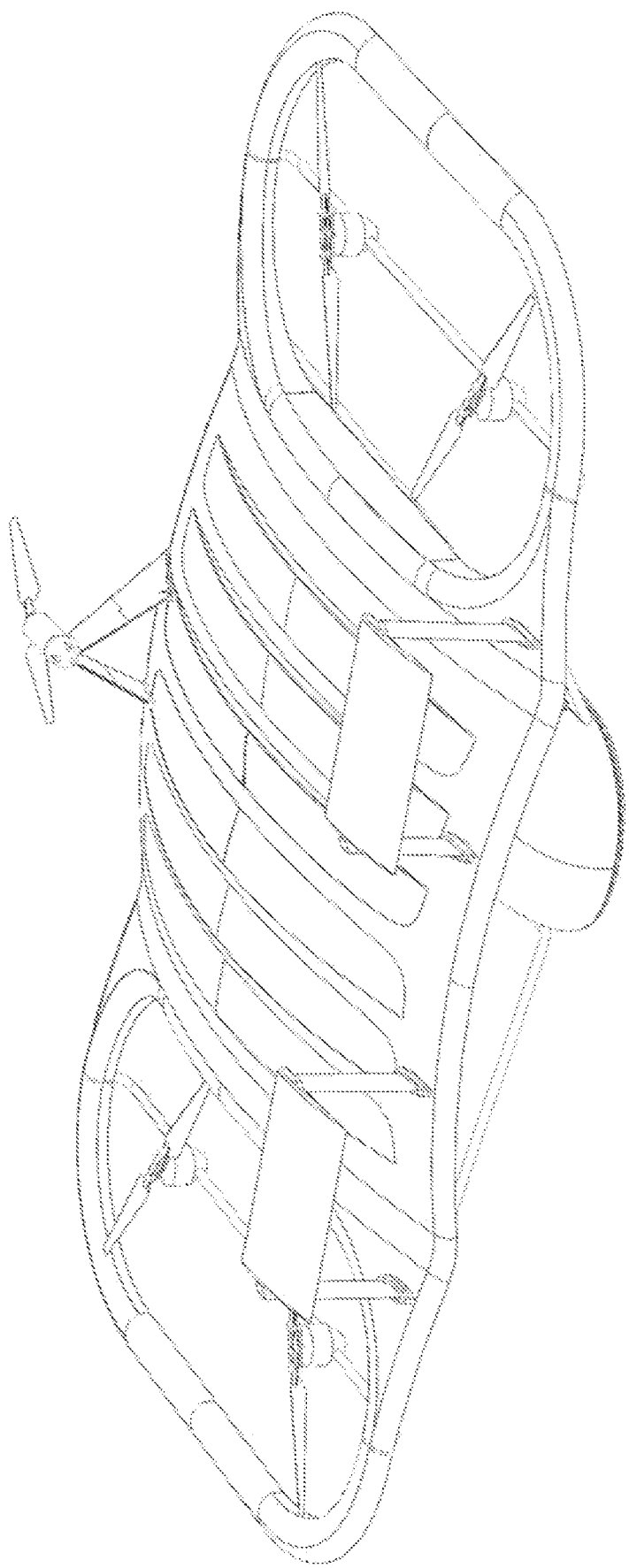
Figure 4D:
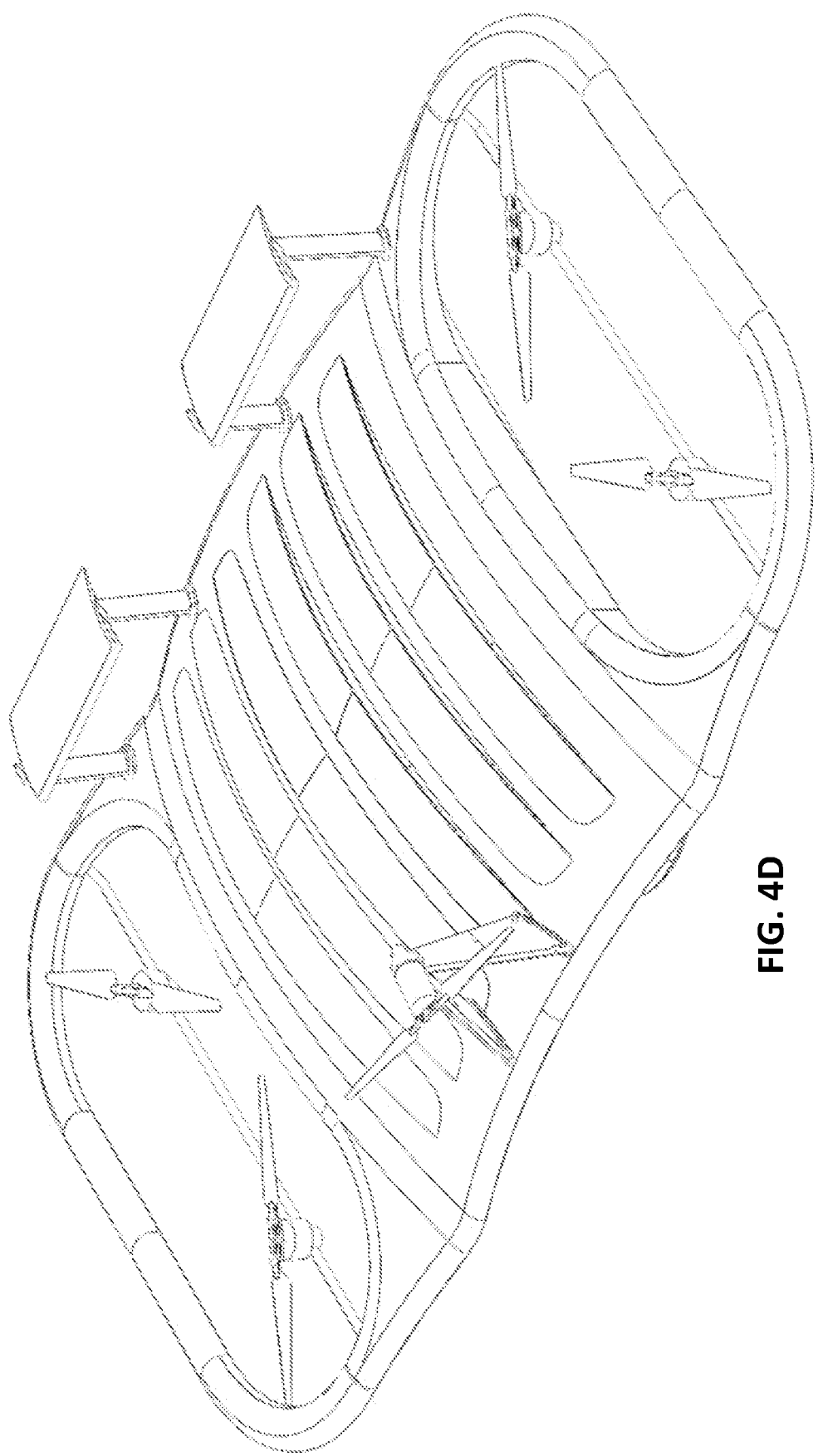
Figure 4E:
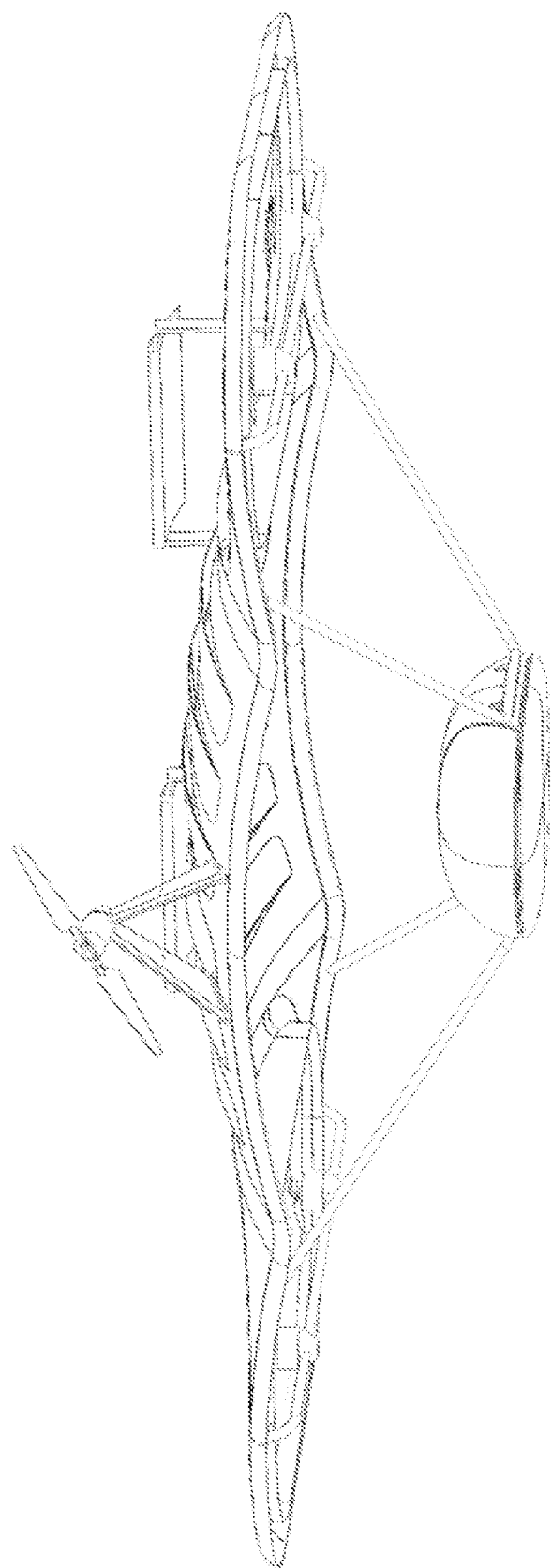
Figure 4F:
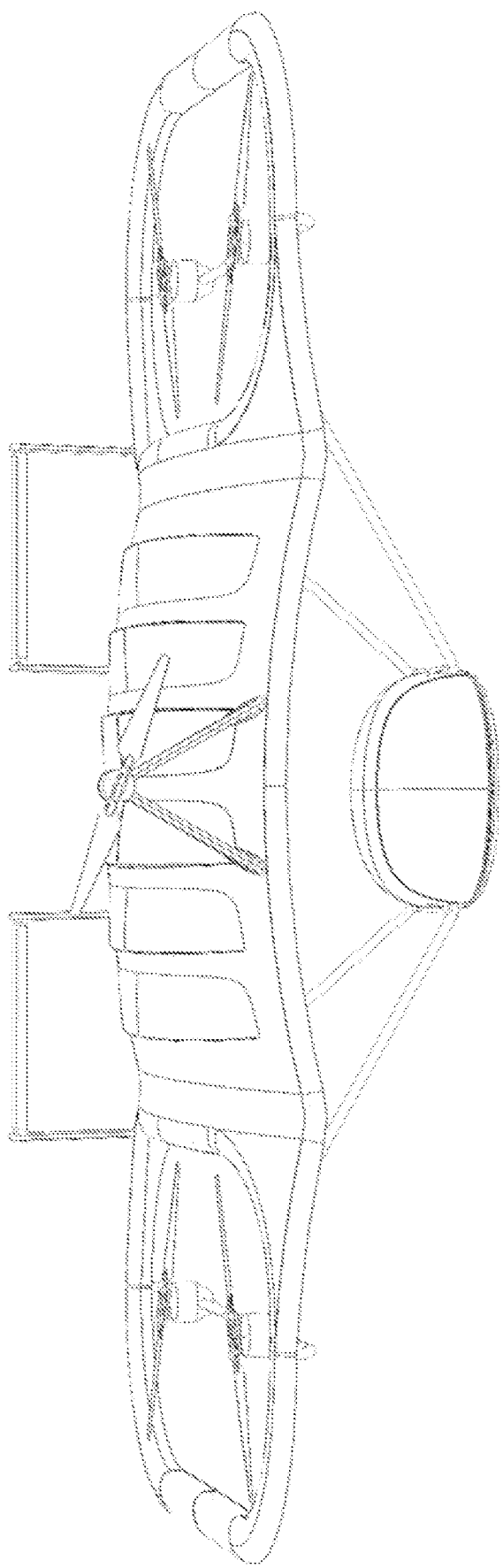
Figure 4G:
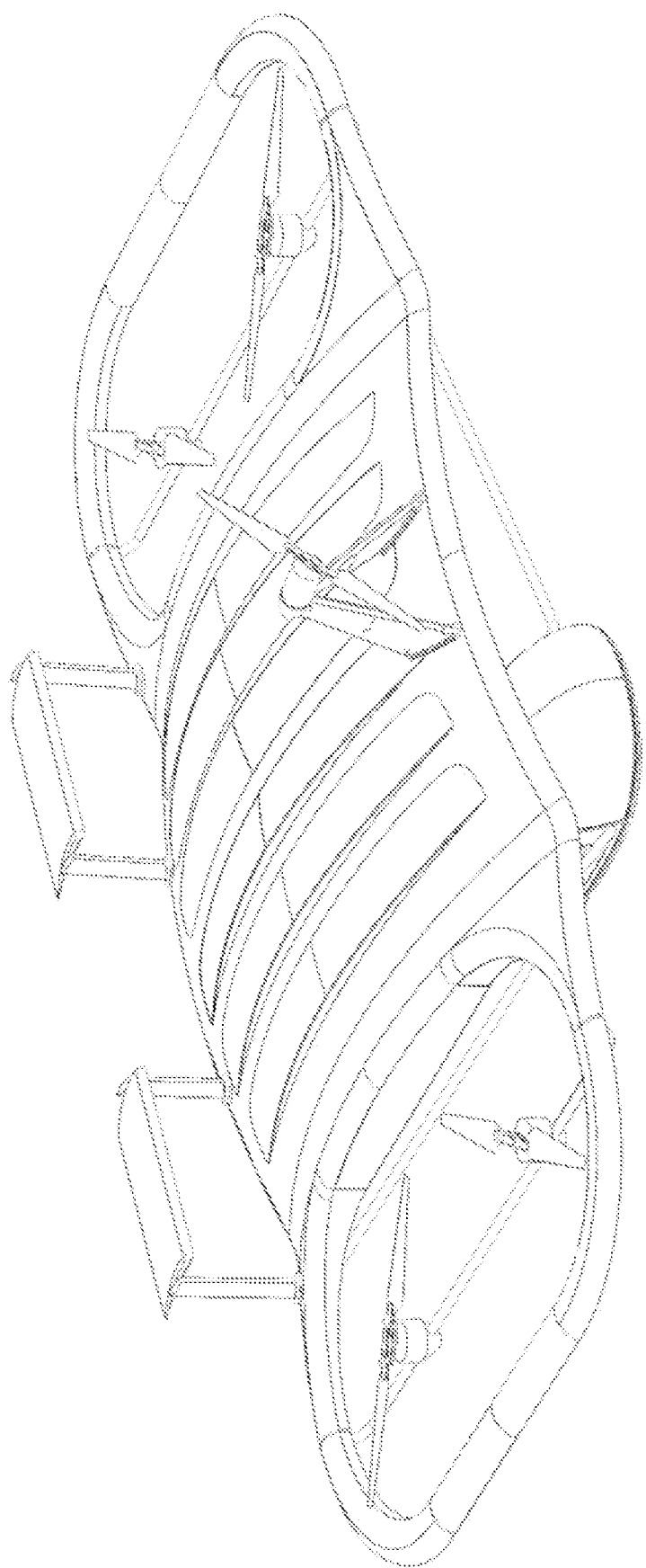
Figure 4H:
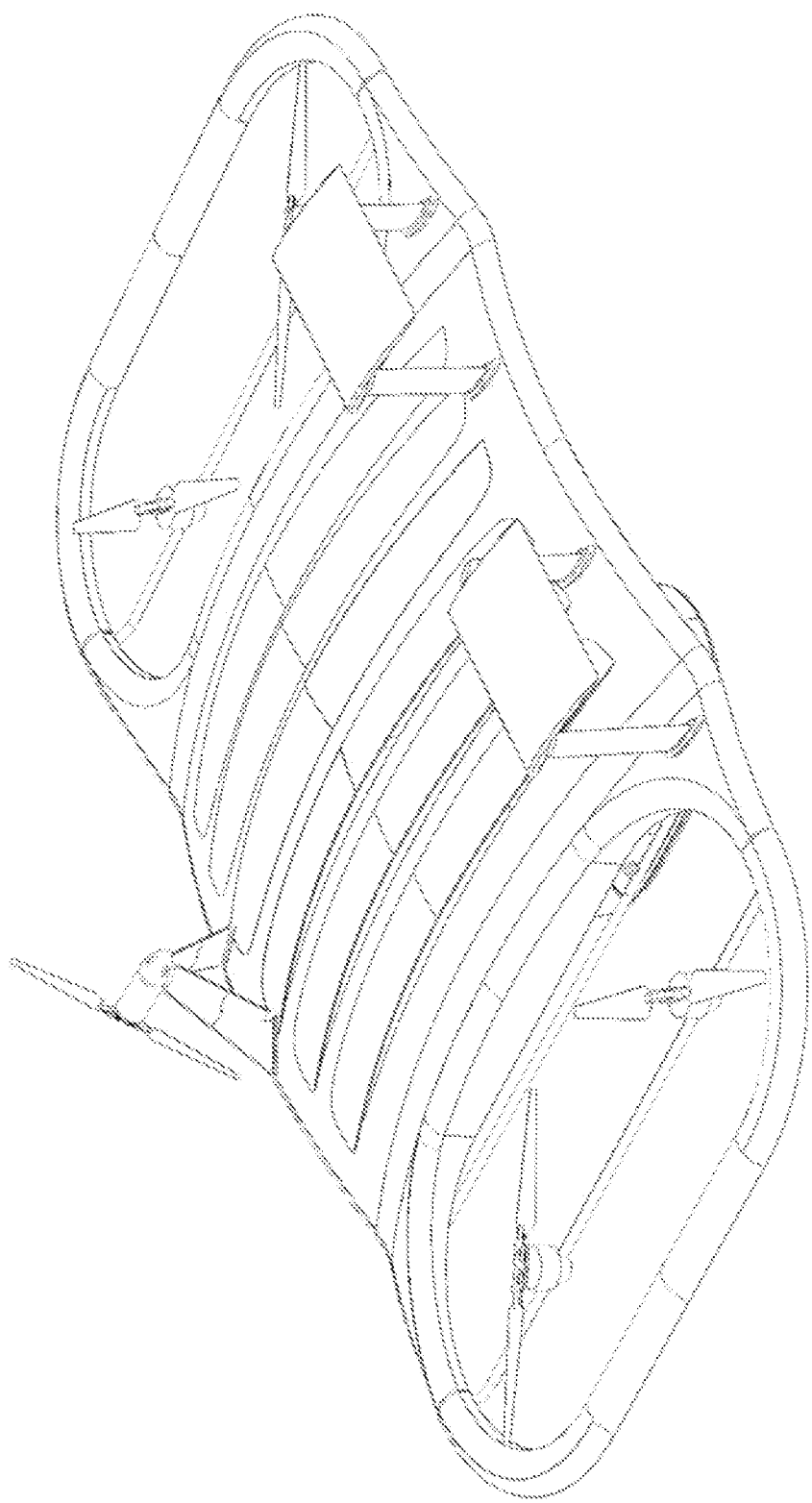
Figure 4I:
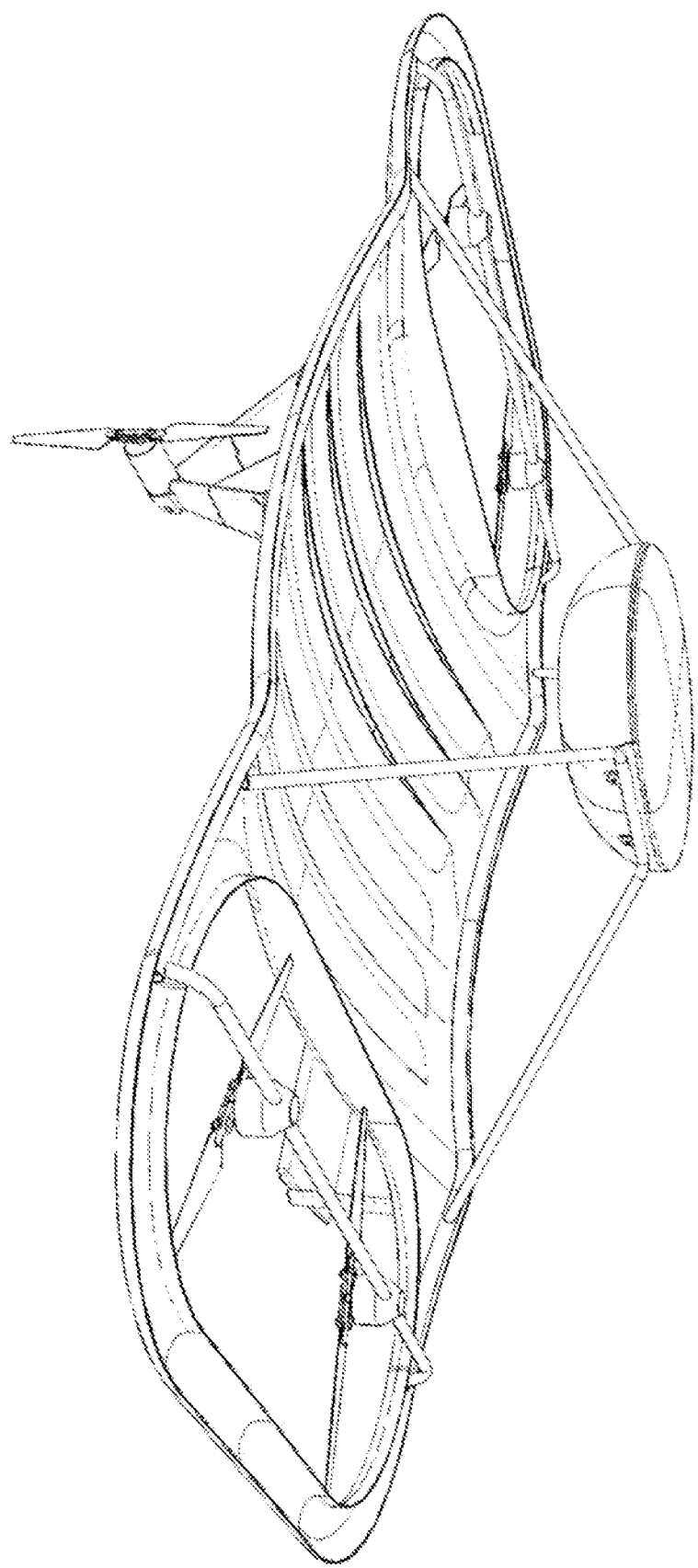
Figure 4J:
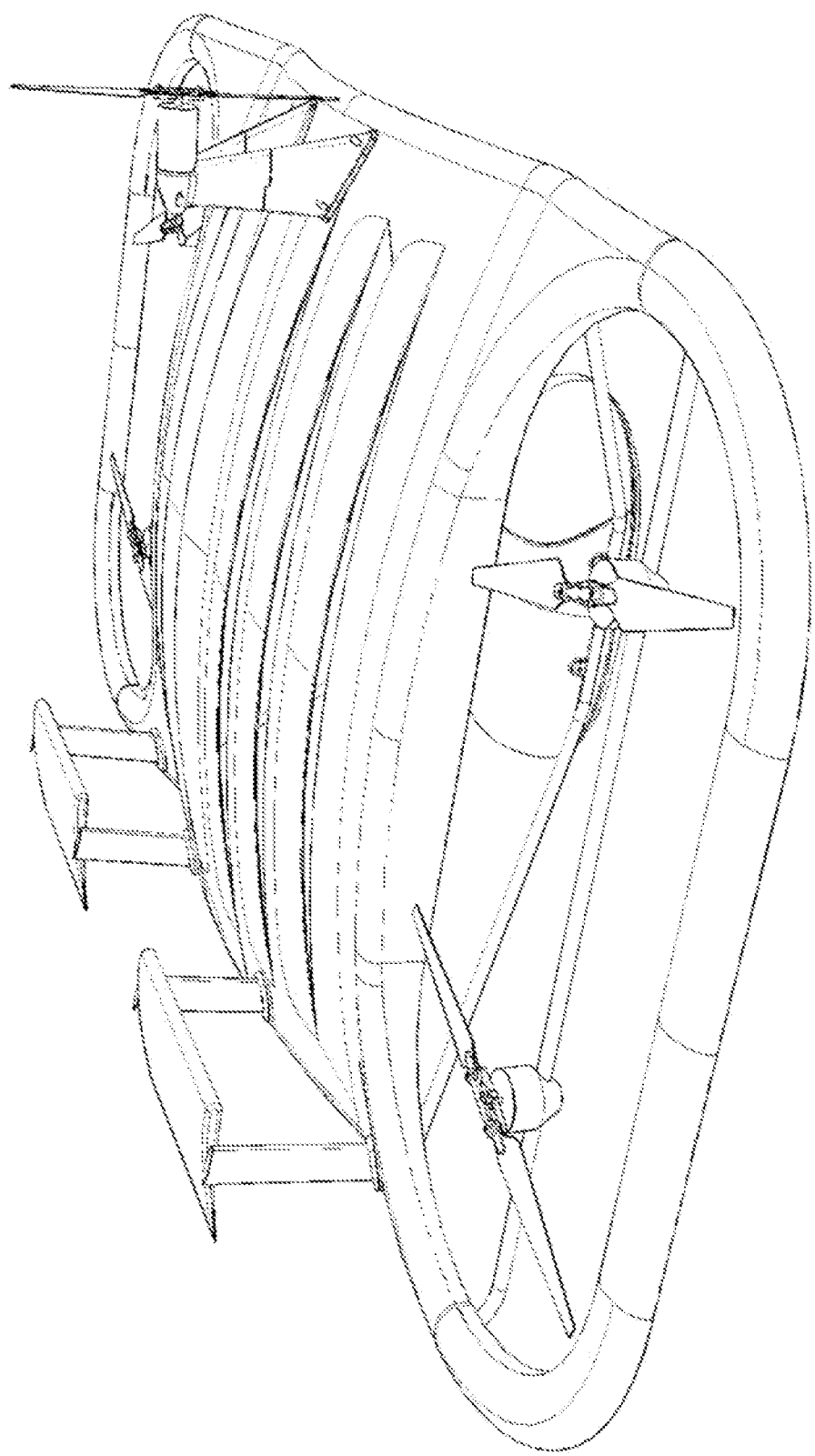
Figure 4K:
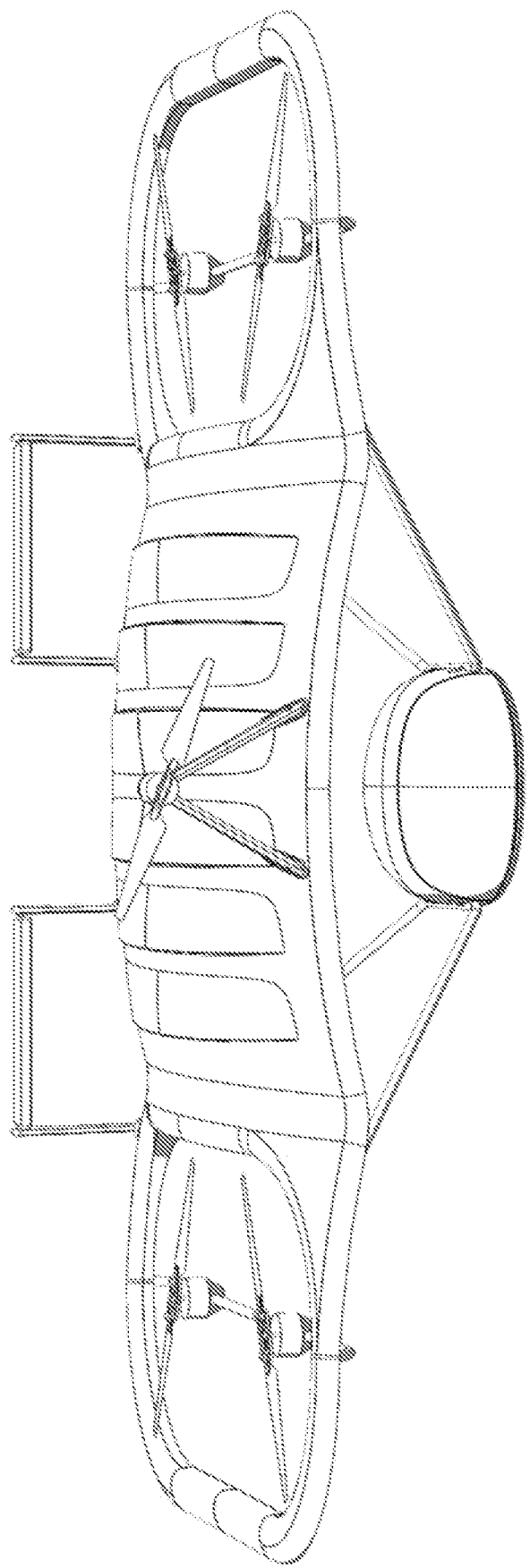
Figure 4L:
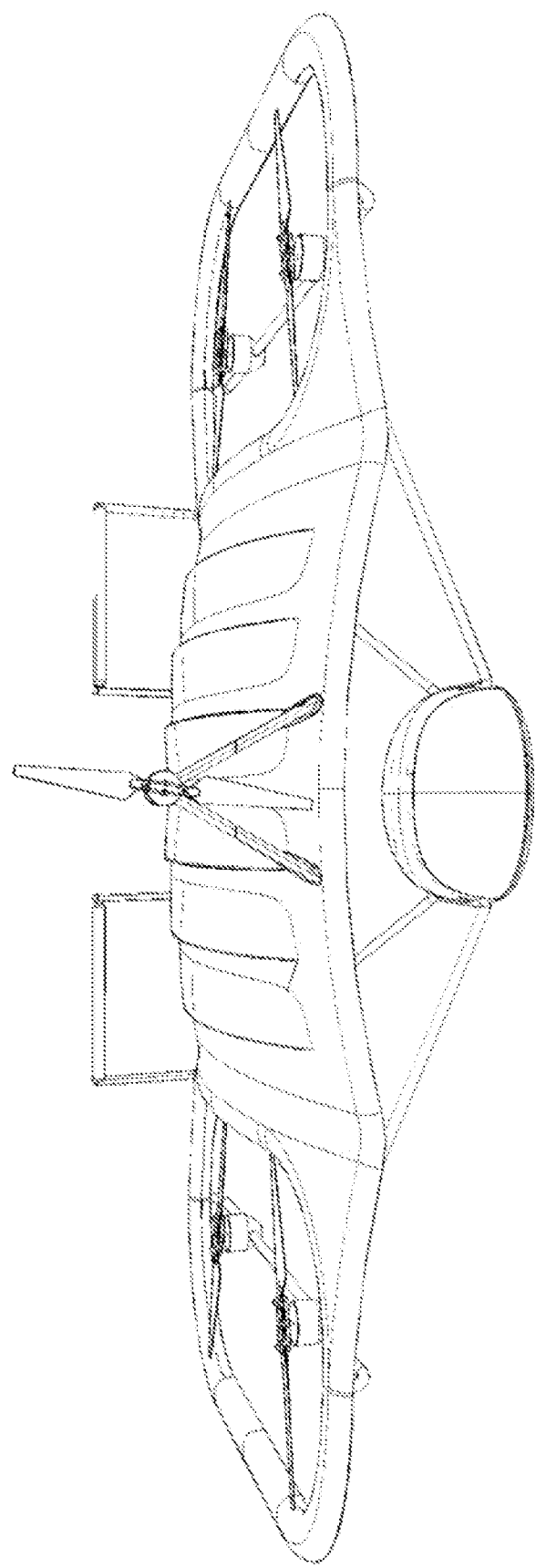
Figure 4M:
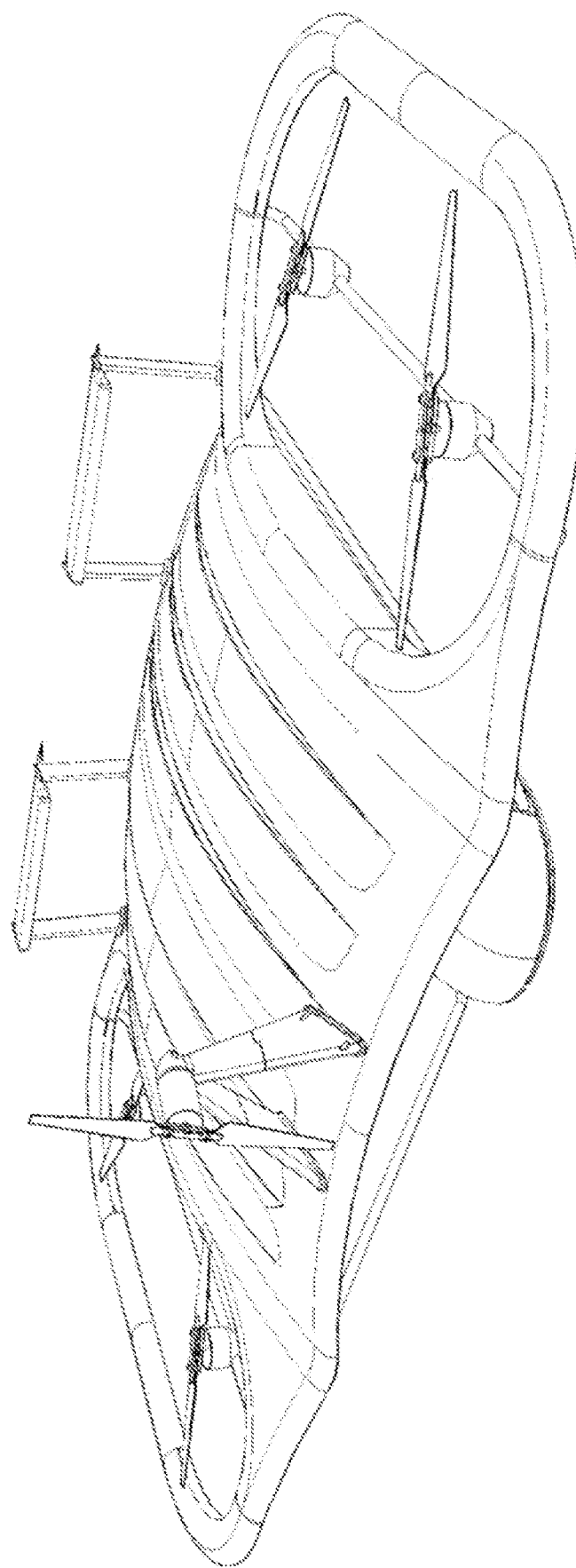
Figure 4N:
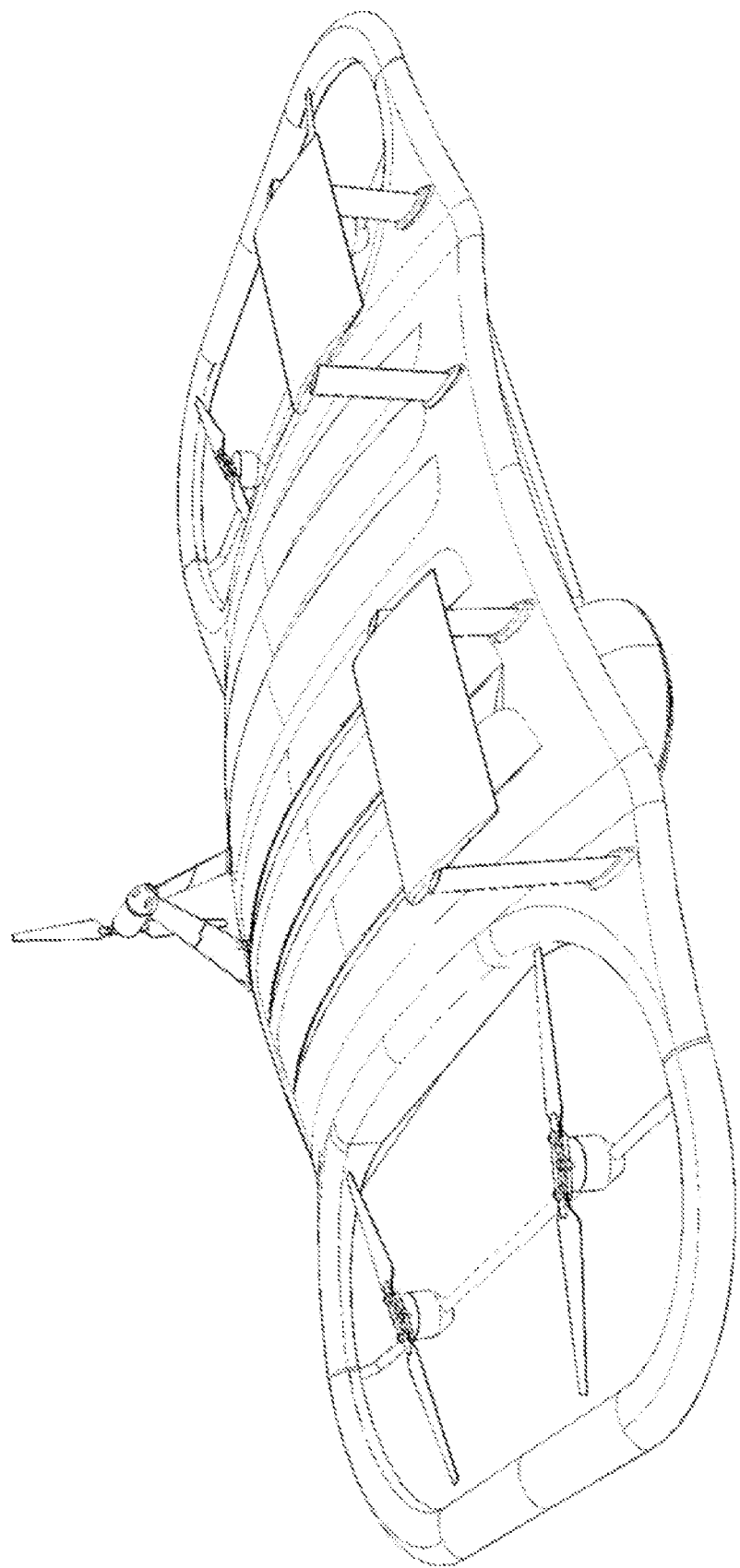
Figure 5:
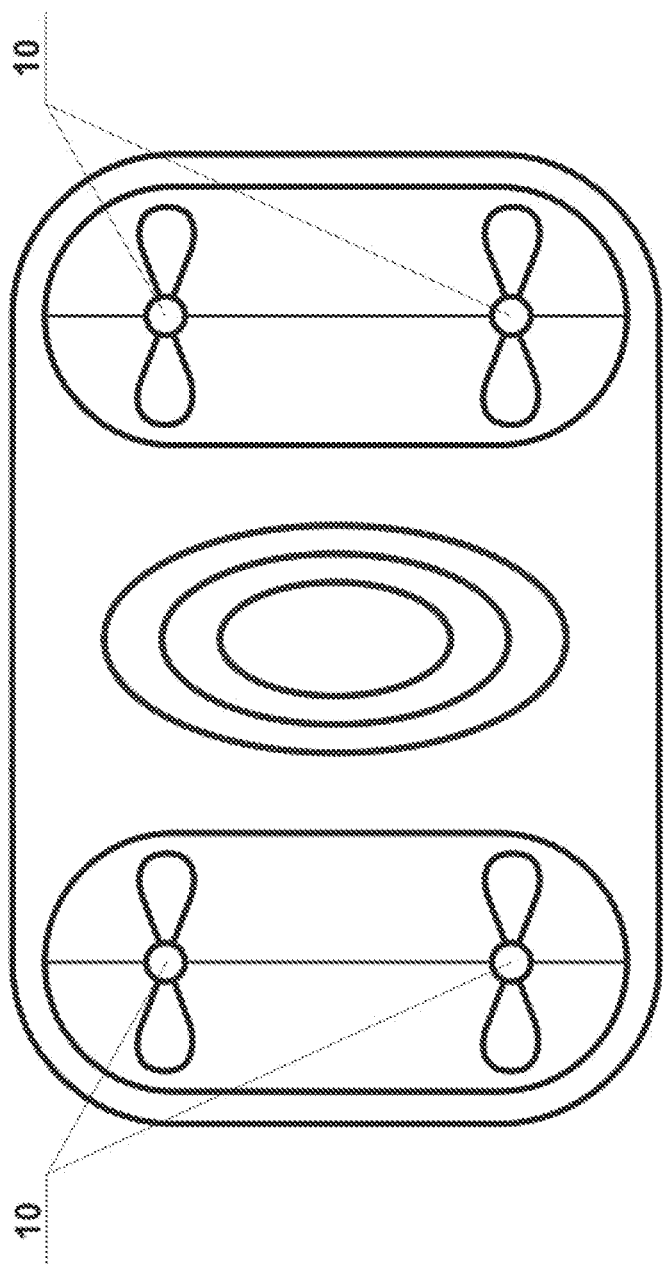
FIG. 5 shows a plan view of the aircraft, with elliptical arrangement of the slots.
Figure 6:
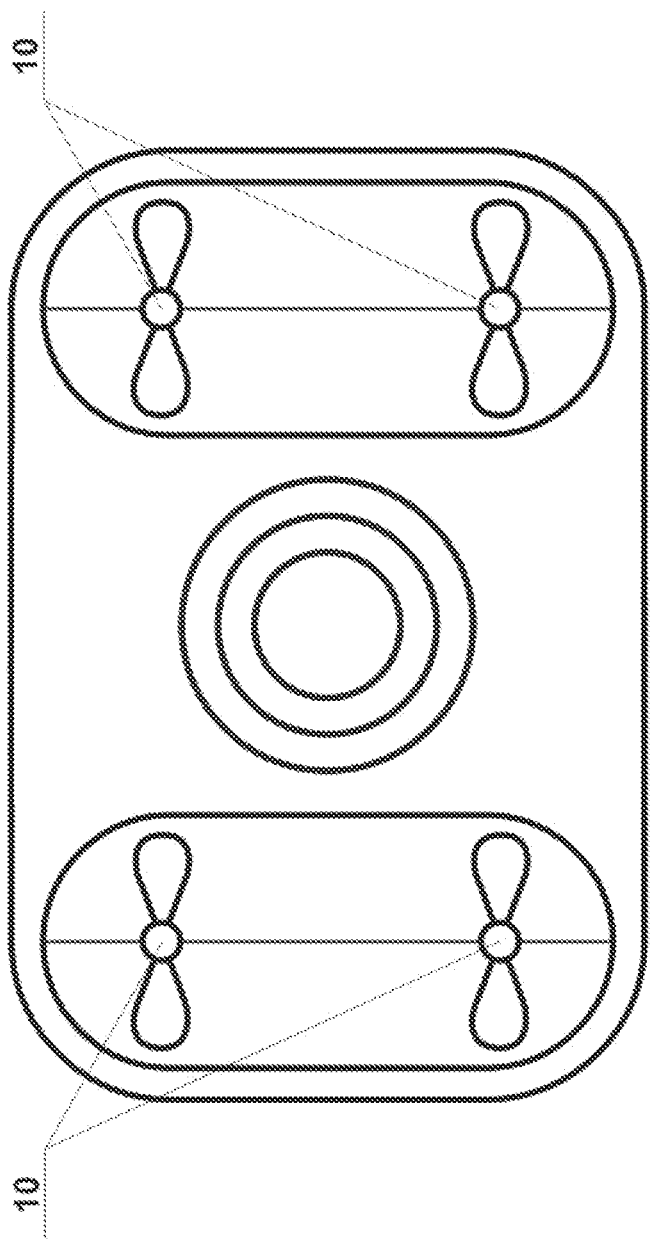
FIG. 6 shows a plan view of the aircraft, with a circular arrangement of the slots.

FIG. 1 shows the front view of the aircraft (slots are not shown for clarity), FIG. 2 shows the aircraft plan view (slots are not shown for clarity), FIG. 3 shows an optional airflow through slots (side view). FIGS. 4A-4N illustrate various perspective views of the aircraft.

The aircraft includes a powerplant disposed in the plane of a parachute 1 connected with a body 3 by braces 5 (FIG. 1). Deformation zone 4 is located at the bottom part of body 3. A control system is disposed in the body (not shown for clarity) and is configured to control flight control surfaces 8. The aircraft center of gravity 6 is located vertically below the aircraft aerodynamic center 7. The parachute 1 is provided with slots 2 and flight control surfaces 8 (FIG. 2). The powerplant (or multiple powerplants) is configured to rotate vertical take-off propellers 10. An alternative embodiment may provide the aircraft with mid-flight engines 9.

An example of the aircraft operation in emergency situations is provided below.

When the aircraft electronics fail and the powerplant shuts down, the propellers stop rotating (they are not capable of independently running down). The aircraft goes into the parachuting mode. In case of a level-flight speed, the body 3 tilts forward, the angle of attack of the parachute 1 significantly increases (the aerodynamic center 7 in a projection onto the horizontal axis naturally is located behind the center of gravity and the level-flight speed rapidly drops). As the level-flight speed reduces, the aircraft gradually goes into the vertical descent mode. In the absence of the forward speed component, the aircraft immediately goes into the vertical parachuting mode. A distinctive feature of the parachuting with the proposed wing is the turning of an airflow 11 along an upper surface of the parachute 1 due to the slots 2 (FIG. 3). This results in a higher air pressure at a lower edge (compression of a free stream and low speed at the lower edge) and extremely low pressure at the upper edge, since the air under high pressure and accelerated to high speed flows toward and along the upper surface of the parachute 1. This produces the pressure differential exceeding that of the conventional parachute and as a result reduces the descent speed. If the propeller is allowed to autorotate with the air passing through, this will further decrease parachuting speed.

Therefore, the aircraft automatically goes into the passive parachuting mode without a need for a control system. In case of an accident, the aircraft glides vertically. Slots 2 ensure a suitable parachuting speed using the parachute 1 having a minimum canopy area.

The aircraft working models operating under this configuration have been developed. Tests have demonstrated that the aircraft having such a structure vertically descends with the powerplant shut down and even under the influence of a crosswind.

This invention may be implemented with the use of the conventional industrial equipment.

Having thus described the different embodiments of a system and method, it should be apparent to those skilled in the art that certain advantages of the described method and apparatus have been achieved.

REFERENCES (INCORPORATED HEREIN BY REFERENCE IN THEIR ENTIRETY)

Application RU 2014105932 A.
Application RU 2014109543 A.
Patent CN107585303—prototype.

What is claimed is:

1. An unmanned aerial vehicle aircraft comprising:
a body;
a powerplant within the body, the powerplant providing for powered flight by transmitting power to propellers; and
a parachute connected to the body by rigid braces and having a fixed rigid shape,
wherein the parachute is in a permanently opened state, and
wherein a center of gravity of the aircraft is located below an aerodynamic center of the aircraft.

2. The unmanned aerial vehicle of claim 1, wherein an angle between a vertical axis passing through the aerodynamic center and an axis connecting the aerodynamic center and the center of gravity is less than 11 degrees.

3. The unmanned aerial vehicle of claim 1, wherein the parachute has slots in its surface that direct air along an upper surface of the parachute to left or right relative to a longitudinal axis of the unmanned aerial vehicle, and a pole vent.

4. The unmanned aerial vehicle according to claim 3, wherein the slots are arranged at different heights.

5. The unmanned aerial vehicle according to claim 3, wherein the slots are centro-symmetrically arranged.

6. The unmanned aerial vehicle according to claim 3, wherein the slots are arranged along and/or across and/or in a circle.

7. The unmanned aerial vehicle according to claim 3, wherein the slots direct air from edges of the parachute toward a center of the parachute.

8. The unmanned aerial vehicle according to claim 3, wherein the slots direct air from a center of the parachute toward edges of the parachute.

9. The unmanned aerial vehicle of claim 1, wherein the braces are crushable upon impact.

10. The unmanned aerial vehicle of claim 1, wherein the body is elliptical in cross section, and a lower part of the body has a deformation zone that deforms upon impact.

11. The unmanned aerial vehicle of claim 1, wherein the parachute is shaped as a wing airfoil, and has a chord and a span.

12. The unmanned aerial vehicle according to claim 3, wherein the slots are arranged over an ellipse of a body of the parachute, in plan view.

13. The unmanned aerial vehicle of claim 1, wherein the center of gravity is located below the aerodynamic center by at least 0.5 parachute chords.

14. The unmanned aerial vehicle of claim 1, wherein an aerodynamic load on the parachute during flight is up to 12 kg/m$^2$.

15. The unmanned aerial vehicle of claim 1, wherein a gap between the body and the parachute is at least 0.9 of a height of the body.

16. The unmanned aerial vehicle of claim 1, further comprising control surfaces disposed above the parachute.

17. The unmanned aerial vehicle of claim 1, wherein the parachute has a V-profile or W-profile.

18. The unmanned aerial vehicle of claim 1, wherein the parachute has an upward-convex shape.

19. The unmanned aerial vehicle of claim 1, further comprising at least one mid-flight engine with a thrust vector directed along a wing chord in an angular range between −12° at +12°.

20. The unmanned aerial vehicle of claim 1, further comprising at least two mid-flight engines disposed along a parachute traverse axis, the engines being symmetric with respect to a longitudinal axis of the parachute.

21. The unmanned aerial vehicle of claim 1, wherein the powerplant includes at least two engines with propellers for vertical take-off and landing.

22. The unmanned aerial vehicle according to claim 21, wherein a resultant thrust vector of the propellers is directed along a vertical axis passing through the aerodynamic center and the center of gravity.

23. The unmanned aerial vehicle of claim 1, wherein the braces are of a round or drop-like cross-section.

* * * * *